United States Patent [19]

DiMatteo et al.

[11] Patent Number: 4,594,001
[45] Date of Patent: * Jun. 10, 1986

[54] DETECTION OF THREE-DIMENSIONAL INFORMATION WITH A PROJECTED PLANE OF LIGHT

[75] Inventors: Paul DiMatteo, Huntington; Joseph Ross, Fort Solanga; Richard Schmidt, Huntington, all of N.Y.

[73] Assignee: Robotic Vision Systems, Inc., Hauppauge, N.Y.

[*] Notice: The portion of the term of this patent subsequent to Jan. 22, 2002 has been disclaimed.

[21] Appl. No.: 539,615

[22] Filed: Oct. 6, 1983

Related U.S. Application Data

[63] Continuation-in-part of Ser. No. 281,068, Jul. 7, 1981, Pat. No. 4,494,874.

[51] Int. Cl.[4] ............................................. G01B 11/24
[52] U.S. Cl. .................................... 356/376; 250/205; 356/1
[58] Field of Search ..................... 356/1, 376; 250/205

[56] References Cited

U.S. PATENT DOCUMENTS

| 4,125,317 | 11/1978 | Gordon et al. | 356/376 |
| 4,299,491 | 11/1981 | Waters et al. | 356/376 |
| 4,443,705 | 4/1984 | DiMatteo et al. | 356/376 |
| 4,494,874 | 1/1985 | DiMatteo et al. | 356/376 |

*Primary Examiner*—R. A. Rosenberger
*Attorney, Agent, or Firm*—Max Fogiel

[57] ABSTRACT

An object is scanned first with a light plane from a variable-intensity light-plane projector, and the reflected light is used as signals to modify point by point the output of the projector in accordance with the intensity of the respective reflective-light signal. Thereupon the object is scanned a second time and the projector is instructed to apply less light than before to those points of the object from which a strong reflected-light signal was received during the first scan, and/or to apply more light to points from which a weak reflected-light signal was received during the first scan. In similar manner, a projected intensity encoded light volume is projected on an object and the reflected light is used as signals to point-by-point modify the output of the projector for subsequent projections.

11 Claims, 7 Drawing Figures

4,594,001

DETECTION OF THREE-DIMENSIONAL INFORMATION WITH A PROJECTED PLANE OF LIGHT

This application is a continuation-in-part of the parent application, Ser. No. 281,068, filed July 7, 1981, and now U.S. Pat. No. 4,494,874.

BACKGROUND OF THE INVENTION

The present invention relates to the detection of three-dimensional information using a projected plane or coded volume of light.

More particularly, the invention relates to overcoming the problem arising in the detection process where the signal received by a camera or photo detector provided for this purpose often suffers from too little or too much light being present at various locations of the item or image being illuminated.

Systems employing the aforementioned type of detection are used, for example, where it is important to determine the position of points and objects (e.g. robot arms, to name only one example) in three-dimensional space. In such systems a moving plane or coded volume of light will be projected upon the object (item) to be illuminated, and the illumination of each area on the object which is touched by the light, will be sensed (and converted into a signal) by a camera or photo detector provided for this purpose. A serious problem with this is that the received signal often suffers from the condition that at one or some locations of the scanned object there may be too much light, whereas at others there may be too little light, so that the final reading is incorrect.

SUMMARY OF THE INVENTION

It is an object of the present invention to broaden the method of implementation to include the use of a plane or coded volume of light whose intensity is adapted to the amount of light reflected from the object being illuminated.

It is also an object of this invention to eliminate or greatly reduce the prior-art problem of inaccurate light signals.

Another object is to decrease the time of measurement.

To achieve with these objects, as well as others, which will become apparent, as the description proceeds, one aspect of the invention resides in a method of detecting three-dimensional information comprising the steps of: projecting a variable-intensity plane of light onto an object to be scanned; effecting a first scan by causing relative movement between object and light plane; receiving light-intensity signals back from the object intersection line by scanned intersection line and modifying the intensity of the plane of light in accordance with each received signal; effecting a second scan by causing relative movement between object and light plane; and reducing the light-plane intensity during the second scan at such points of the object where the signal was strong during the first scan and increasing the light-plane intensity during the second scan at such points where the signal was weak during the first scan.

A second aspect of the present invention resides in a method of detecting three-dimensional information comprising the steps of: projecting variable-intensity coded light volumes (digital or analog encoding to distinguish unique locations within the volume); receiving light intensity signals back from the object; modifying the intensity of the volume of light in accordance with each received signal (reducing the light intensity at such points of the object where the signal is strong during the first projection and increasing the light intensity at such points where the signal is weak during the first projection); and projecting subsequent intensity encoded light volume(s).

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

DESCRIPTION OF PREFERRED EMBODIMENTS

Figure 1:
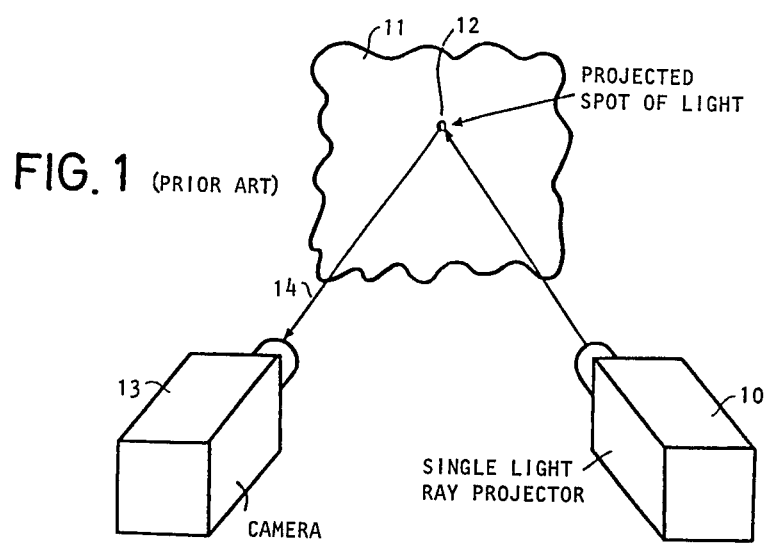
FIG. 1 is a diagrammatic illustration, showing one prior-art system related to the present invention.

One prior-art system that has been initially mentioned is shown in FIG. 1 wherein reference numeral 10 identifies a projector of the type which projects a single light ray to produce a projected spot of light 12 on an object 11 to be examined. A camera 13 is positioned so that it receives reflected light 14 from the spot 12. The camera records this reflected light. The object 11 or projected spot 12 moves so that the spot 12 travels over the object 11. At some locations, the object 11 will receive (or reflect to the camera 13) more light than at others, with the result that the record made in the camera will be inaccurate.

Figure 2:
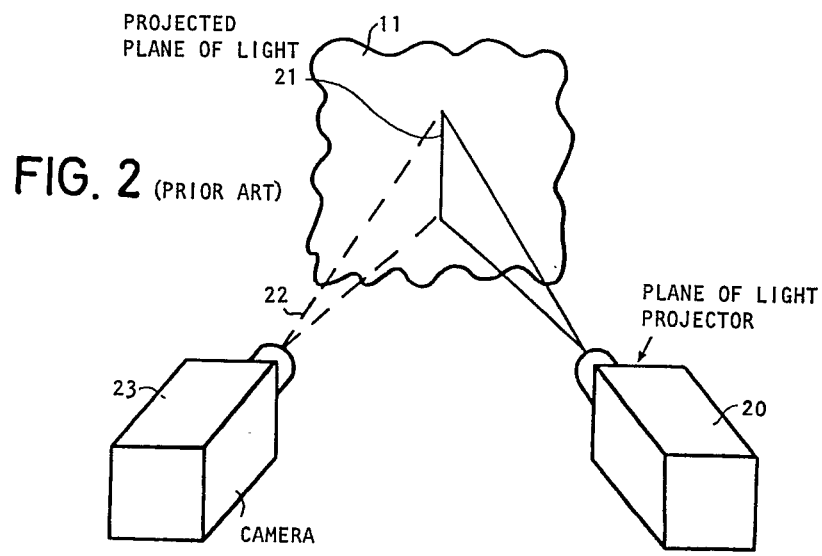
FIG. 2 is a view similar to FIG. 1, but showing another prior-art system.

Another prior art system is shown in FIG. 2, where the object to be scanned is again identified with reference numeral 11. The only difference in this embodiment from the preceding embodiment in FIG. 1 is that FIG. 2 uses an (also known) projector 20 of the type which projects a plane 21 of light, instead of a point. The reflection 22 of the intersection of the object surface and the plane of light 21 (which is, of course, again made to travel over the object 11) is received in a camera 23. The disadvantage are the same as in FIG. 1.

Figure 3:
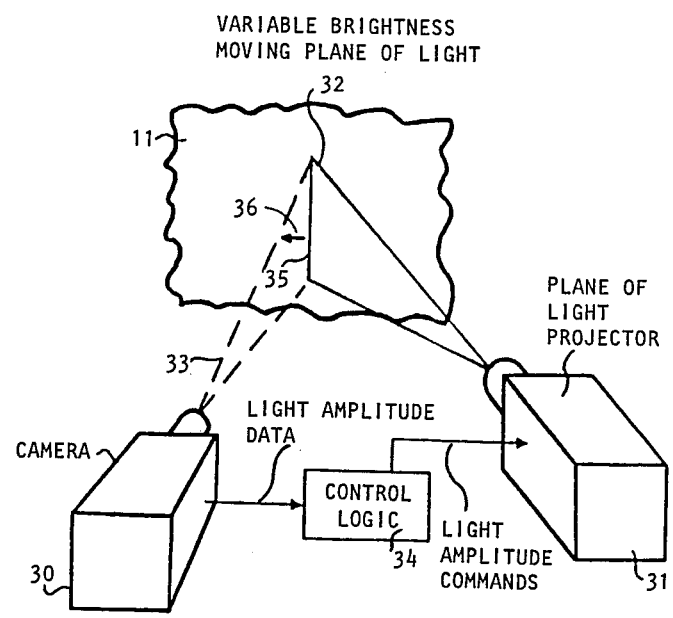
FIG. 3 is diagrammatic view illustrating an exemplary embodiment of the present invention.

To overcome these disadvantages, the present invention provides a solution which is illustrated in FIG. 3.

In FIG. 3, the object to be scanned is again identified with reference numeral 11, and the camera is designated by reference numeral 30. Unlike the prior art, however, the projector 31, which is used, is of the type producing a so-called plane of light 32 and, in addition, the output of the projector 31 has variable brightness.

Figure 4:
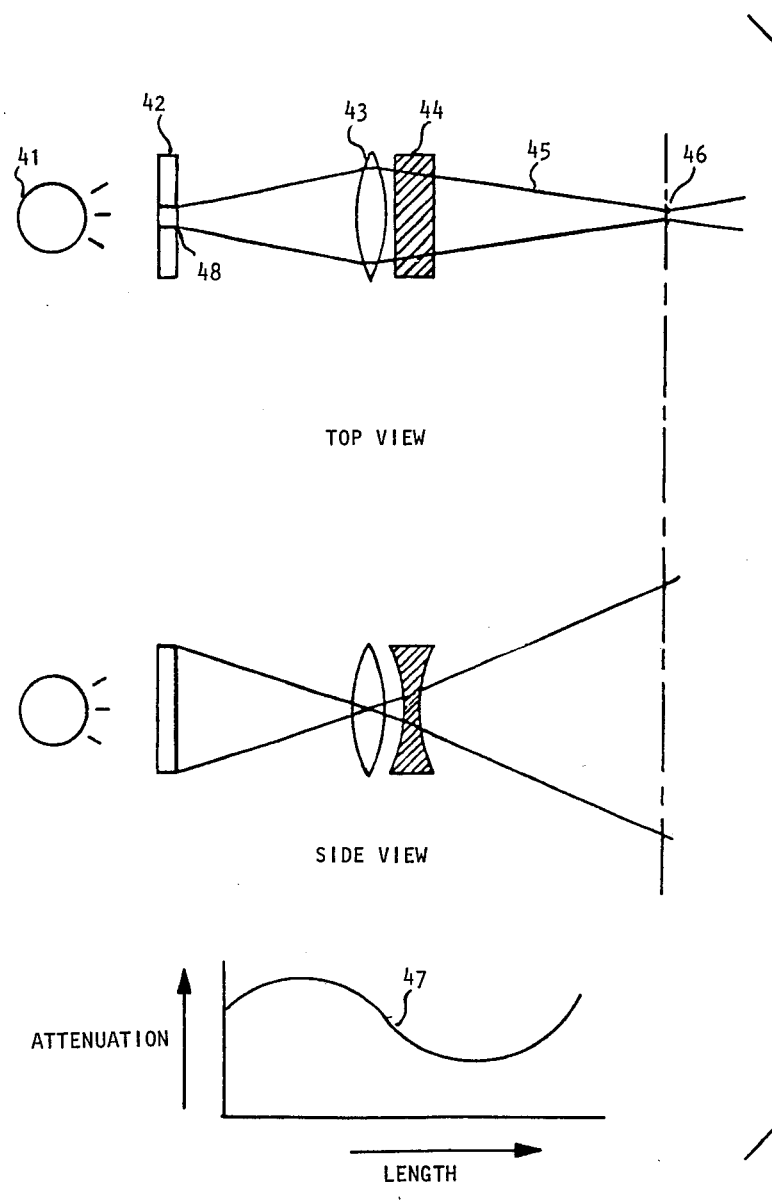
FIG. 4 is an optical schematic of a projector with a graph of the attenuation function.

FIG. 4 illustrates one means of implementing a projector with this property. A light source 41 illuminates a light modulator 42, which is an attenuating device such as a liquid crystal device (LCD), an amplifying device such as light valve, or a device capable of both attenuation and amplification of selected portions of the aperture. Light modulator 42 is commanded by the light amplitude commands of the control logic 34 to produce a varying amount of attenuation (or gain or both) along the length of the device aperture. Graph 47 illustrates a typical modulation function. The aperture 48 of modulator 42 through which light is passed (or from which it is reflected in the case of a liquid crystal light valve) is shown narrow in the top view and wide in the side view. The light from aperture 48 is imaged by lenses 43 and 44 into a narrow plane of light 46 in the image plane.

In operation, a double rather than a single measurement (i.e. scan) is performed. In the first measurement the brightness signal 33 received back from the camera 30 from the light line 35 is measured point-by-point along the intersection of the projected plane of light 32 and the object 11 surface. The measured brightness is used to modify the output of the projector 31 point-by-point and plane by plane.

During the subsequent second measurement (scan) the control logic 34 (known per se) instructs the projector 31 to transmit more light, than during the first scan, to those places of object 11 where, during the first scan, the light signal received in camera 30 was low (weak). Conversely, those places of object 11 from which during the first scan the light signals reflected into the camera were strong, receive less light from the projector 31 during the second scan.

The plane of light 32 may either be stationary with respect to the projector, as in FIG. 2, or it may traverse the surface of the object 11, as shown by path direction 36 in FIG. 3.

Figure 5:
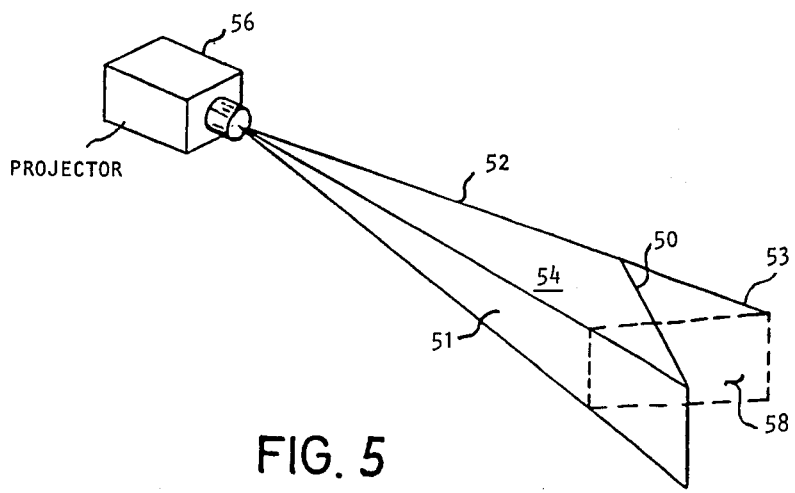
FIG. 5 is an isometric view of a projector with a linearly encoded light volume intensity variation.

Another prior art projector 56 is shown in FIG. 5 where an intensity encoded volume 54 of light is used in place of a scanning plane 32 of light. In this particular embodiment, two volumes of light are sequentially projected. The first volume has maximum intensity along plane 51, reducing linearly as represented by sloped plane 50, to minimum intensity along plane 52. The second volume has maximum intensity along plane 53, reducing linearly as represented by sloped plane 58, to minimum intensity along plane 51. The disadvantages are again the same as in FIG. 1.

Figure 6:
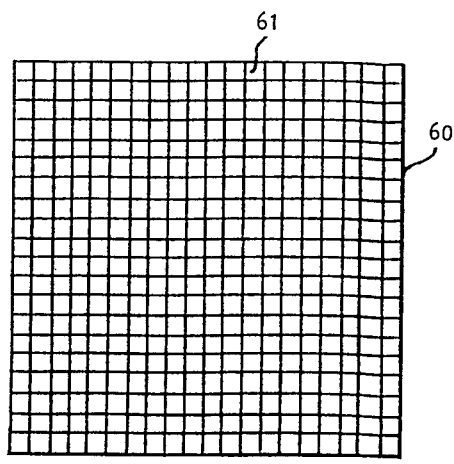
FIG. 6 is a diagrammatic view of an LCD light modulator in the direction of light transmission.
Figure 7:
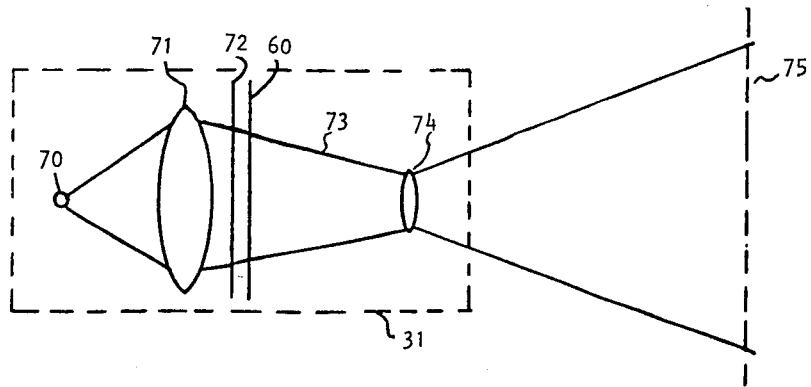
FIG. 7 is an optical schematic of a variable light intensity, encoded light volume projector, in accordance with the present invention.

To overcome these disadvantages, the same method of determining a map of light intensities is followed as in FIG. 3. Camera 30 provides control logic 34 with signals proportional to the light intensities received from illuminated surface 11. Projector 31, now replaced by light volume projector 56 receives light amplitude commands from control logic 34 and modifies subsequent projected light volumes 54. Electrically controlled light modulators that can amplify and/or attenuate individual parts of light volume 54 will provide the desired function. For example, a liquid crystal (LCD) 60 with separate row and column controls as shown in FIG. 6 could be used. The intersection of a row and column form a common area called a pixel that may be controlled to provide attenuation on a continuously variable scale or function as an on-off light transmission gate having just two states. LCD 60 is placed in projector 56 as shown in FIG. 7, where projector 56 is shown schematically. Light source 70 is focused on lens 74 by lens 71. Mask 72 is fully illuminated by the light passing through lens 71. Light passing through Mask 72 is imaged by lens 74 in the focal plane 75 which may be in the vicinity of an object to be measured. Light passing through Mask 72 also passes through LCD 60 which can attenuate the light passing through each pixel independently either in an analog manner or by switching from off to on during a fraction of the integration time of camera 30.

Mask 72 and Modulator 60 may be incorporated into a single device to further simplify the system.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A method of detecting three-dimensional information, comprising the steps of: projecting a variable-intensity plane of light onto an object to be scanned; effecting a first scan by causing relative movement between said object and said plane of light; receiving light-intensity signals from said object from said plane of light; applying a second scan by causing relative movement between said object and said plane of light; and modifying the light-plane intensity during the second scan; increasing the light-plane intensity during the second scan at such points where the signal was weak during the first scan; and reducing the light-plane intensity during the second scan at such points where the signal was strong during the first scan.

2. In an arrangement for detecting three-dimensional information, a combination comprising: means for projecting a variable-intensity plane of light onto an object to be scanned; means for receiving light-intensity signals back from the object from said plane of light during a first scanning of said object; means for increasing the light-plane intensity during the second scan at such points of the object where the signal was weak during the first scan; and means for reducing the light-plane intensity during the second scan at such points where the signal was strong during the first scan.

3. A combination as defined in claim 2, wherein said projection means comprises a variable light-intensity light plane projector.

4. A combination as defined in claim 3, wherein said receiving means comprises a camera; said increasing means and said reducing means comprising a control logic means connected between said camera and said projector.

5. A combination as defined in claim 2, wherein said receiving means comprises a camera.

6. A combination as defined in claim 2, wherein said increasing means and said reducing means comprises control logic means.

7. A method of detecting three-dimensional information, comprising the steps of: projecting a first set of intensity encoded volumes of light onto an object to be measured; receiving light intensity signals from the object; projecting a second set of intensity encoded volumes of light; reducing the light volume intensities during the second projection at such points on the object where the signals were strong beyond a predetermined level during the first projection; and increasing the light volume intensities during the second projection at such points on the object where the signals were weak below a predetermined level during the first projection.

8. In an arrangement for detecting three-dimensional information, according to claim 7, a combination comprising: means for projecting intensity encoded volumes of light onto an object to be measured; means for receiving during a first projection upon the object, light intensity signals back from the object; means for reducing the intensities within each projected light volume during a subsequent second projection at such points on the object where the signal was strong beyond a predetermined level during the first projection, and for increasing the light intensity during the second projection at such points on the object where the signal was weak below a predetermined level during the first projection.

9. A combination as defined in claim 8, wherein said projection means comprises a variable light intensity, encoded light volume projector.

10. A combination as defined in claim 9, wherein said receiving means comprises a camera; and said modifying means comprises control logic means connected between said camera and said projector.

11. A combination as defined in claim 9, and a single light modulator for providing both the variable light intensity and light volume encoding functions.

* * * * *